Figure 1:
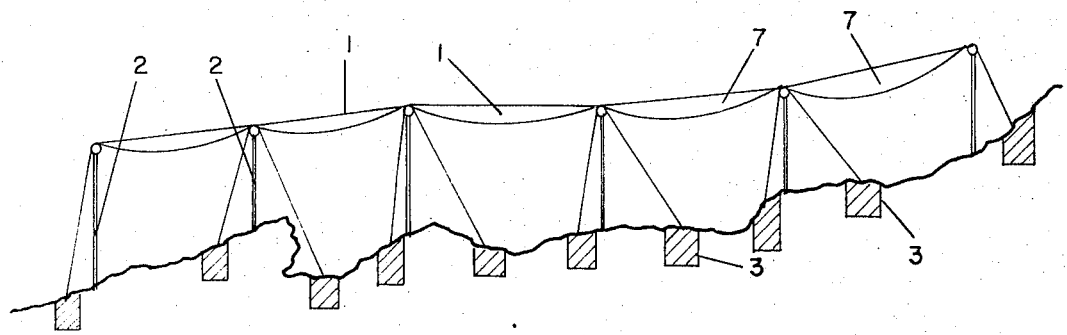

United States Patent [19]

Figari

[11] 3,828,684
[45] Aug. 13, 1974

[54] ELEVATED MONORAIL URBAN OR SUBURBAN TRANSPORTATION SYSTEM

[76] Inventor: Jorge Galvez Figari, Capitan Haya, 3 and 5, Madrid, Spain

[22] Filed: May 30, 1972

[21] Appl. No.: 257,493

[30] Foreign Application Priority Data
May 28, 1971  Spain ................................ 391695

[52] U.S. Cl..................... 104/124, 104/89, 104/112
[51] Int. Cl............................................. E01b 25/14
[58] Field of Search ..................... 104/89, 112–117, 104/123, 124, 148

[56] References Cited
UNITED STATES PATENTS

| 345,828 | 7/1886 | Bleichert et al. | 104/115 |
| 398,097 | 2/1889 | Torres | 104/117 |
| 689,610 | 12/1901 | Gamalielson | 104/117 |
| 826,015 | 7/1906 | Burnaby | 104/115 |
| 827,312 | 7/1906 | Jolly | 104/115 |
| 897,978 | 9/1908 | Hicks | 104/117 |
| 903,656 | 11/1908 | Beardsley | 104/115 |

Primary Examiner—Robert J. Spar
Assistant Examiner—Lawrence J. Oresky
Attorney, Agent, or Firm—Browne, Beveridge, DeGrandi & Kline

[57] ABSTRACT

An elevated monorail transportation system employing a vehicle track consisting of a series of lengths of high strength cable each extending between and supported adjacent its end portion on adjacent support towers spaced along the track. The individual lengths of track cable act as one conductor for supplying electric power to the vehicles moving thereover, and a second cable extending generally parallel to and below the track cables acts as the second conductor. The ends of the track cables are supported on pulleys on the towers and are guided downwardly and laterally thereby in a direction to avoid interfernce with vehicles suspended on and moving over the track, with the ends of the respective track cables being anchored and retained under high tension at each support tower.

3 Claims, 8 Drawing Figures

PATENTED AUG 13 1974  3,828,684

SHEET 3 OF 3

ELEVATED MONORAIL URBAN OR SUBURBAN TRANSPORTATION SYSTEM

As the title indicates, this invention refers to an urban or suburban transportation system on monorail. In this system all of the steps necessary have been adopted, not only for obtaining from same the maximum safety in transportation but also to avoid any kind of drawbacks which could arise with relation to same, such as agglomerations, sensation of fear, dizziness, rocking, etc.

The main purpose of the transportation system is to transport a large number of people between two points located at almost any distance, with intermediate stations being provided for long runs with detours in the monorail if stops have to be made. This transportation is carried out in a minimum period of time, trying to eliminate the problems of delay caused by intense automobile traffic and traffic of vehicles in general between the points involved which are joined by this transportation system, which brings together various favorable conditions such as conditions of privacy similar to those of the automobile since the maximum capacity of the vehicles is set at eight people; the fact that it provides a constant flow of vehicles in agreement with the number of users of the system; that it is within the reach of any type of economic level and that it makes it possible for all of the occupants of each vehicle to clearly enjoy the scenery.

The system in itself makes it possible to lay out the run under topographical conditions with maximum slopes of 10 percent and to clear spans without intermediate supports of the rail of up to 1,200 meters, it being possible for the vehicles to move under any climatological condition, allowing not only the access to urban zones but even runs through them; the system does not contaminate the atmosphere since electrical energy is used as the energy source, producing a smooth, rapid and fearless movement of the vehicles, due to the small capacity of the vehicle and the way it grips the rail by means of rubber tires, eliminating the sensation of speed as the vehicles' height from the ground is controlled since the cables which constitute the rail are connected in high-tension performance with the consequent elimination of the overhead distribution network of same.

Concerning the safety measures, this system is broadly guaranteed by the manner in which the rubber tires grip the rail, eliminating the possibility of driving accidents since it is controlled by an electronic system which regulates access to the rail from the dead-end rails located at the arrival and departure points or else in intermediate stations, the spacing between the vehicles in accordance with demand, stops, and, in the case of emergency or accident, acceleration or deceleration of the departure and arrival points or in intermediate stations, running at a constant speed, etc., giving, as a result, apart from the corresponding safety, a low operating and working cost.

Essentially, the improvements are constituted by the provision of an elevated transportation system on aluminized steel cables which are electronically sensitized and which, clearing spans of up to 1,200 meters between support bridges and connected at high tension, reduces as much as possible the overhead distribution network, tending to form a straight line, its ends passing through pulleys inclined 45° with relation to the vertical plane and fixed to the sustaining towers which constitute the support points, these cables being anchored in the ground by means of large concrete footings buried in the ground in order to maintain the tension at which they are connected, this tension being maintained in geographical areas which are occasionally subject to seismic movements by means of counterweights on the ends of the cables, trying to avoid the propagation of the seismic waves to same. This cable which constitutes the rail is formed of multiple strands of steel and it is large enough in diameter to support the prior tension at which it is connected, its own weight, the loads constituted by the number of vehicles which it supports, and the span which it may clear between points of support.

Parallel to this cable, on a vertical plane, or below it, a second cable is placed with a slight overhead distribution which acts as a conductor of electricity so that, together with the neutral constituted by the upper cable, the monophase current which constitutes the electromotive force of the system can be formed, the electrical energy network being placed in a network parallel to the run, with feeding to the rail in each of its sections and precisely in the anchors of the cables duly insulated, avoiding as much as possible rail drop due to the length of the rails and their poor conductor capacity.

The continuity of the track between the end and the beginning of each section is constituted by a union rail, also electrified, which makes it possible to pass the pulleys which hold and slide the vehicles along from one cable to the next.

The electrical supply is, then, fed directly from the track to the vehicles, it being possible, however, to make this supply automomous for each vehicle by means of accumulators or batteries placed in them.

The system of adherence and sliding of the vehicles over the rail consists fundamentally of a prehensile system of pulleys, the upper pulleys which slide over the tensed cable supporting the weight of the vehicle itself and the load of people, the movement being generated by an electric motor, fed through two lower pulleys which slide along the second cable and which, by means of a lever arm, with its bearance located between both pulleys, presses down on same in the opposite direction as its overhead distribution and due to the weight of the vehicle and the people, connected to said lever arm, making the load of the lower cable fall on the bearance of the lever arm, thus obtaining the maximum force of uniform adherence of the upper wheels on the guide cable or rail at the same time as the effect of remounting the lower cable by the lower pulleys is achieved without sudden pitching. The electric motor, connected to the upper pulleys by driving chains through an endless axle, gives the wheels a spinning speed with which, as they are made of rubber and there are several of them, they are able to attain a high sliding coefficient over the cable and therefore a high performance of the electric motor which moves them, this latter being controlled by the regulation of the amount of current delivered to the track, it being the endless axle which connects and disconnects the electric motor and the pulleys.

Since the electric motor is placed to one side of the axis of the rail there is a transversal shift of the center of gravity of the vehicle, this shift being corrected by a slight curvature in the rod which joins the slide to the lever arm of the upper pulleys.

The corresponding departure and arrival stations, intermediate stations, dead-end tracks for accumulating vehicles not in use at that moment, intermediate sustaining towers which act as points of support for the cables, parallel electrical energy network and electronic control system complete this elevated transportation system.

Below we shall provide a detailed description of the improvements referred to, with reference to the attached drawings in which we show, merely as a non-limiting example, a preferred form of implementation, susceptible to any change in detail which would not mean a fundamental alteration of the essential characteristics of same:

In said drawings we show:

In FIG. 1: Run diagram of the monorail in geographical situations not affected by seismic movements.

Figure 2:
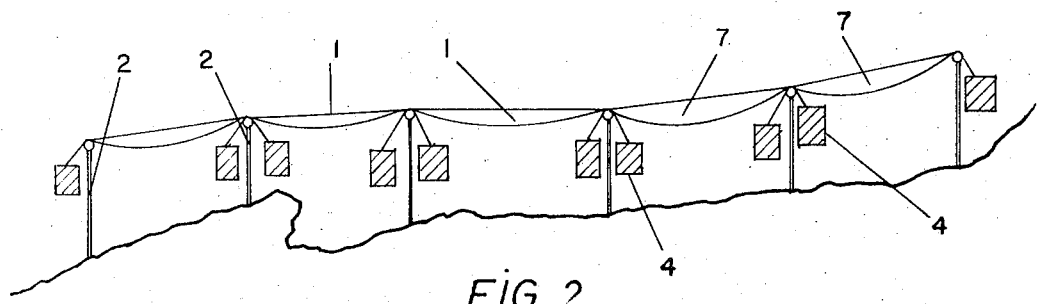

In FIG. 2: Run diagram of the monorail in geographical situations occasionally subject to seismic movements.

Figure 3:
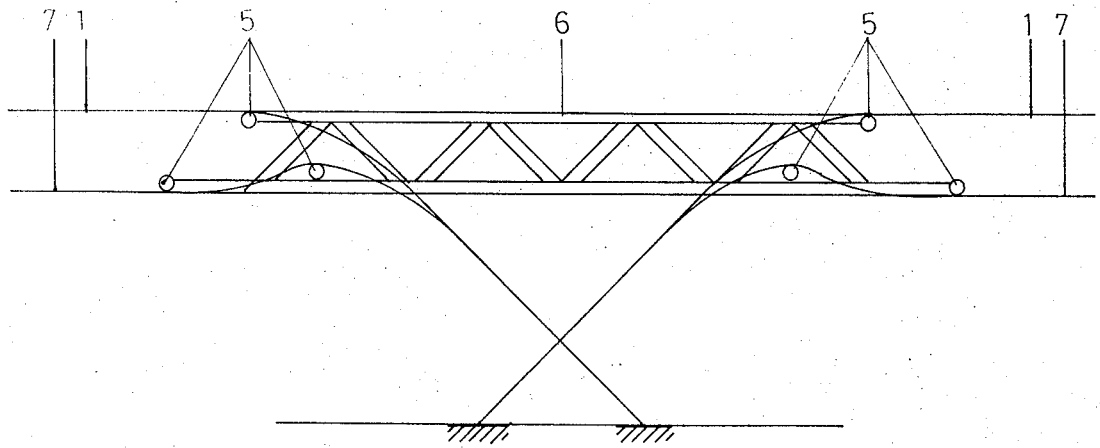

In FIG. 3: Diagram of the continuity rail between the cables of each section.

Figure 4:
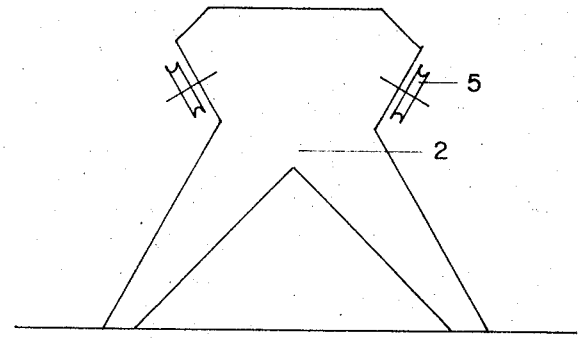

In FIG. 4: Diagram of a sustaining tower of cables with resolution of forces pulleys fixed to same.

Figure 5:
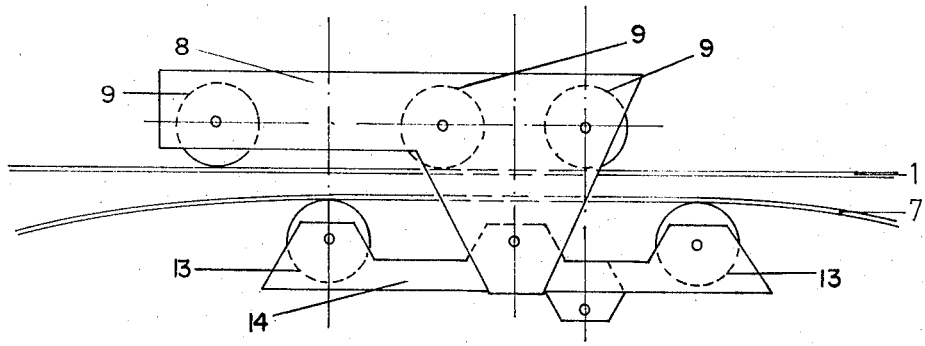

In FIG. 5: Side elevational view of the body of slide pulleys.

Figure 6:
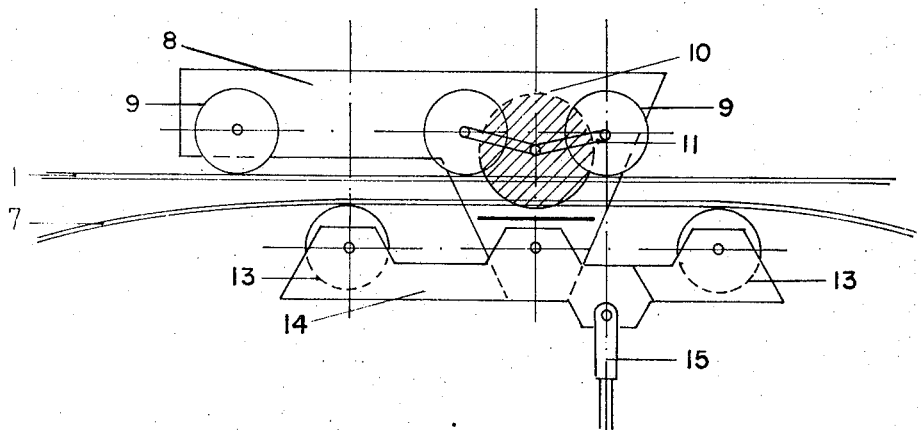

In FIG. 6: Longitudinal sectional drawing of the body of slide pulleys.

Figure 7:
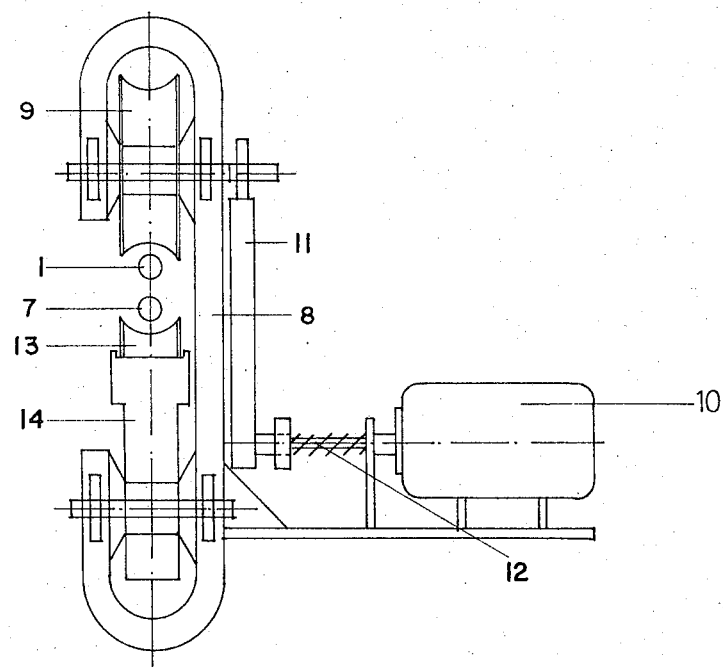

In FIG. 7: Transversal direction view of the body of slide pulleys with the electric motor.

Figure 8:
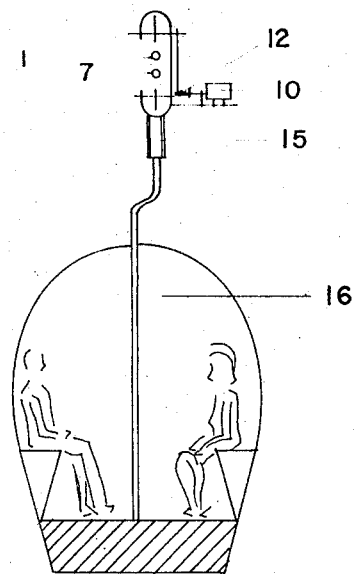

In FIG. 8: Longitudinal sectional drawing of the body of slide pulleys with the lever arm and the passenger car joined to same.

According to the example of implementation shown, the improvements which are put forth consist of a monorail composed of a cable —1— made of aluminized steel with multiple strands which is sectioned and which, supported by the ends of the different sections which compose the two directions of the monorail in sustaining towers —2— and clearing spans of as much as 1,200 meters, is subjected to a great operating tension which reduces its overhead distribution as much as possible, this tension being produced by the anchoring of the ends of the cables of each section in large concrete footings —3— in geographical situations which are not affected by seismic movements, while in geographical areas which are occasionally subject to such movements the tension of the cables is produced by counterweights —4— hung from the ends, trying to avoid the propagation of the seismic waves. The monorail may be laid out under any climatological condition and in topographical situations which produce in cable —1— maximum slopes of up to 10 percent.

The ends of each cable section —1— rest on and slide over pulleys —5— with variable diameters in accordance with the diameter or resistant section of the cable 1—1, the same being fixed to the sustaining towers —2— and tilted 450 with relation to the vertical plane, thus diverting their direction and so making it possible for them to exert their tension systems. The continuity of the run is ensured by the fact that the ends of the cable —1— of each section are joined by a continuity rail —6— which may be made of several kinds of metal beams, such as, for example, plain web girders, lattice trusses, etc., but always ensuring the continuity of the run.

Parallel to cable —1— on a perpendicular plane and below it there is a second cable —7— with characteristics analogous to those of the first which is electrified in order to constitute, together with the neutral of cable —1—, the monophase current which is the electromotive force of the system, the electrical network being run parallel to the track and the current collection for the network being made in the end restraints of the ends of the cables —1— and —7— in each section, which are duly protected by insulation, it being possible, however, to constitute the electromotive force of the system by autonomous systems such as batteries or accumulators.

The adherence and sliding system of the vehicles over the monorail consists fundamentaly in a prehensile system of pulleys, constituted by a sliding body —8—, composed by a series of rubber pulleys —9— which slide over cable —1— and support their own weight and the load of the users, the rear pulleys being pulling pulleys the movement of which is generated by an electric motor —10— which, connected to pulleys —9— by means of chains —11— and through an endless axle —12— gives them a spinning speed which, since the pulleys are made of rubber and are several in number, makes it possible for them to reach a high coefficient of sliding over the cable and therefore a high performance of the electric motor which moves them.

On a plane below the pulleys —9— sliding over the cable —7— with a slight overhead distribution, there are two pulleys —13— which, supporting the load of the cable on which they slide, transmit it to the bearance of the lever arm —14— which joins them, thus attaining the maximum force of uniform adherence of the upper pulleys on the guide cable or rail and allowing the effect of remounting the lower cables by the pulleys to be done without sudden pitching. From the lever arm —14— and at the bearance where the load of cable —7— is transmitted a rod —17— is hooked on which is slightly curved and therefore balances and compensates for the shifting of the center of gravity of the vehicle which is produced by the electric motor —10— being placed to one side of the cable —1—, the passenger car —16— being hung from said rod —15—, transmitting the load of the car and the weight of the car itself to the cable —7— through the lever arm —14— in this way creating the prehensile system of the cables —1— and —7— by means of pulleys —9— and —13—, therefore producing the greater adherence of the upper pulleys to the cable.

The energy which moves the single-phase electric motor —10— can be taken directly from cables —1— and —7— by means of pulleys —9— and —13—; in this case the cars —16— are insulated by means of rod —15— made of appropriate material such as fiberglass, plastic, etc., or else the energy may come from batteries or accumulators placed in the lower parts of the cars —16— making each vehicle autonomous insofar as movement is concerned.

The entire system is regulated by an electronic control system which, ruling the vehicles by means of signals transmitted through cable —1— which is electronically sensitized, regulated access to the monorail of loaded vehicles, the spacing between them in accordance with the demand of the users of the system, the stops of the vehicles in case of emergency or accident, the acceleration or deceleration of the vehicles in the departure and arrival points or in possible intermediate stations by means of cutting the supply of energy to the electric motors —10—, which may be asynchronous, in this case transforming in this case the mechanical energy of the sliding over the cable of the load into electric energy which will be delivered to cables —1— and —7— or else to the accumulators or battery, therefore contributing to the economy of the system; exerting control on the performance of the electric motor.

Moreover, the electronic control system may regulate the rolling of the vehicles at a constant speed, the stopping time of the vehicles, etc., the result of all of this being a low operating and working cost.

The installation of the departure and arrival stations, as well as of the intermediate stations, will depend on the topographical conditions of the run; in any event, their installation may be of great versatility due to the 10 percent slopes which the vehicles can handle, thus making access to the vehicles possible not only at the level of the monorail but also at ground level, there being in both cases and in said stations the necessary dead-end track installations for accumulating vehicles not in service at any given moment and due to a lack of demand for same.

The shape, materials and dimensions may be variable and, in general, the same is true for everything which is accessory and secondary, just as long as it does not alter, change or modify the essence of the system which is being described.

The terms in which this specification is drawn up are a true and faithful reflection of the object described and should be taken in a broad sense and never in a limiting manner.

The applicant reserves the right to obtain supplementary certificates of addition for improvemnts which may be seen as advisable in the light of future practice.

NOTE

Having sufficiently described the nature and scope of the invention, as well as the manner of putting it into practice, the following peculiarities are claimed in a privative manner; which peculiarities should be the object of the granting of the privilege of the PATENT OF INVENTION which has been applied for.

I claim:

1. In an elevated monorail transportation system including an elongated track supported by a series of towers disposed in spaced relation along the length of the track with an electrically powered vehicle suspended beneath the track by a trolly mounted on the track for movement thereover and electrical conductor means for supplying electric power to the vehicle for driving the vehicle along the track, the improvement wherein said track comprises a plurality of lengths of high strength cables, one of said length of cables mounted on and extending between each successive pairs of said towers and cooperating to define successive aligned segments of said track, mounting means on each of said towers for supporting the individual lengths of cable thereon at a point spaced from the ends of the respective lengths of cables, said mounting means including anchor means below and laterally offset from said track for anchoring the ends of said cables, pulleys fixed on said towers with the axis of rotation thereof extending at a substantial angle with respect to the horizontal, said lengths of cable extending over said pulleys and downwardly thereform to said anchor means whereby the downwardly extending end portion of said cables are deflected from the line of said track in a direction inclined with respect to the verticle at an angle sufficient to prevent interference with said suspended vehicle moving beneath said track, means connected to each end of each said cable length for maintaining a high tensile load on said successive aligned segments of said track, the end portions of the successive aligned segments of said track on each said tower being spaced from and substantially aligned with each other, a rigid rail member mounted on each said tower between said spaced aligned segments and cooperating therewith to form a bridge spanning the distance between said aligned segments, a second cable extending between and electrically insulated from said high strength cable segments, and electrically conductive means on said vehicle engaging said high strength cable segments and said second cable for supplying electric current to said vehicle as said vehicle moves between said towers, said electrically conductive means on said vehicle engaging said bridge means between said aligned segments, said bridge means cooperating with said electrically conductive means to supply current to said vehicle at said towers, said trolly including a plurality of pulleys engaging said high-strength cables, at least selectrive ones of said pulleys having a coating of high friction resilient material on the surface thereof for engaging said track, and at least one pulley engaging said track and making electrical contact therewith for supplying electric current to said vehicle.

2. The elevated monorail transportation system as defined in claim 1 wherein said second cable has a lesser tensile load therein than said high strength cable length, whereby said second cable has greater catenary between said successive towers than said length of high strength cable, said electrically conductive means engaging said second cable comprising pulley means mounted in spaced relation below said high strength cables and engaging the bottom surface of said second cable and positioned to support a portion of the weight of said second cable as said vehicle moves along said track between successive towers.

3. The elevated monorail transportation system as defined in claim 2 wherein said second cable comprises a plurality of lengths of cable, one extending between each pair of successive towers in spaced relation below the length of said high strength cable, said bridge means including means engaging the electrically conductive means on said vehicle normally engaging said second cable for supplying electrical power thereto when said vehicle is positioned on said bridge.

* * * * *